US012436397B2

(12) United States Patent
Sulzer et al.

(10) Patent No.: US 12,436,397 B2
(45) Date of Patent: Oct. 7, 2025

(54) METHOD AND SYSTEM OF CONTROLLING A DISPLAY ON A WORK MACHINE HAVING GRADE CONTROL

(71) Applicant: Deere & Company, Moline, IL (US)

(72) Inventors: Bryan D. Sulzer, Dubuque, IA (US); Bryan J. Rausch, Durango, IA (US); Benjamin D. Pacholl, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 237 days.

(21) Appl. No.: 18/050,546

(22) Filed: Oct. 28, 2022

(65) Prior Publication Data

US 2024/0142784 A1 May 2, 2024

(51) Int. Cl.
*G02B 27/01* (2006.01)
*B60K 35/81* (2024.01)
*B60W 50/14* (2020.01)

(52) U.S. Cl.
CPC .......... *G02B 27/0179* (2013.01); *B60K 35/81* (2024.01); *B60W 50/14* (2013.01); *B60W 2050/146* (2013.01); *G02B 2027/014* (2013.01); *G02B 2027/0183* (2013.01)

(58) Field of Classification Search
CPC ....... B60K 35/00; B60K 35/81; E02F 9/2296; E02F 9/267; E02F 9/261; G05D 1/0246; G01S 19/14; B60W 50/14
See application file for complete search history.

(56) References Cited

U.S. PATENT DOCUMENTS

| 6,058,339 A * | 5/2000 | Takiguchi ............ G05D 1/0246 701/28 |
| 6,452,570 B1 * | 9/2002 | Kuenzner .............. B60K 35/81 345/184 |
| 6,766,600 B2 * | 7/2004 | Ogura ................... E02F 9/2296 37/348 |
| 10,280,597 B2 | 5/2019 | Izumikawa |

(Continued)

FOREIGN PATENT DOCUMENTS

| DE | 112022001927 T5 | 2/2024 |
| EP | 3604695 B1 | 7/2021 |

OTHER PUBLICATIONS

German Search Report issued in application No. 102023125258.5 dated May 15, 2024, 12 pages.

*Primary Examiner* — Yuri Kan (57) ABSTRACT

A display system and method for a work machine having grade control is disclosed. The display system includes the frame of the work machine, a grading element, an actuator, a grade control system, a display, a sensor, and a controller. The actuator is coupled to the grading element to controllably drive movement of the movable grading element. The display is configured to display information related to movement of the grading element relative to a target zone. The sensor provides detection signals from which a distance between a position of the grading element and the target zone can be determined. The controller has a non-transitory computer readable medium with a program instruction to grade the surface. The program instructions when executed causes a processor the controller to do the following. The controller receives the detection signals and changes the scale of the display information based on the detection signals.

20 Claims, 12 Drawing Sheets

(56) References Cited

U.S. PATENT DOCUMENTS

| | | |
|---|---|---|
| 10,697,153 B2 | 6/2020 | Sherlock |
| 10,962,360 B2 | 3/2021 | Oglesby et al. |
| 11,149,405 B2 | 10/2021 | Hogan et al. |
| 2003/0001751 A1* | 1/2003 | Ogura .................. E02F 9/2296 340/425.5 |
| 2008/0091520 A1* | 4/2008 | Hatori .................... G01S 19/14 342/357.24 |
| 2014/0058635 A1* | 2/2014 | Furukawa ............... E02F 9/267 701/50 |
| 2021/0071390 A1 | 3/2021 | Kean |
| 2021/0079625 A1* | 3/2021 | Narikawa ............... E02F 9/261 |

* cited by examiner

METHOD AND SYSTEM OF CONTROLLING A DISPLAY ON A WORK MACHINE HAVING GRADE CONTROL

TECHNICAL FIELD

The disclosure relates to a method and system of controlling a display on a work machine having grade control.

BACKGROUND

Grading operations with work machines is a specialized phase of the construction process. Proper ground preparation ensures expected outcomes in architectural construction, control of water runoff, road construction, environmental impact and compliance with land grading standards. Current work machines utilize LED light bars to communicate a position of an implement relative to a target position to an operator. However, this form of grade control display has limitations in the amount of information and type of information communicated to the operator. Furthermore, the LED light bars lack a standardized interface from one type of work machine to another. Therein lies an opportunity to improve the information of a grading operation communicated to an operator while running the work machine.

SUMMARY

A display system and method for a work machine having grade control is disclosed. The display system includes the frame of the work machine, a grading element, an actuator, a grade control system, a display, a sensor, and a controller. The grading element is movably coupled to the frame. The actuator is coupled to the grading element to controllably drive movement of the movable grading element. The grade control system is operably coupled to the grading element to control the actuator. The display is configured to display information related to movement of the grading element relative to a target zone. The sensor provides detection signals from which a distance between a position of the grading element and the target zone can be determined. The controller has a non-transitory computer readable medium with a program instruction to grade the surface. The program instructions when executed causes a processor the controller to do the following. The controller receives the detection signals and changes the scale of the display information based on the detection signals.

The display information comprises of a first metric display element which represents at least a partial scope of movement of the grading element in the vertical direction. The display information further comprises of a target identifier overlapping a portion of the first metric display element wherein the target identifier represents one or more of a target surface and target zone.

The display information further comprises of a second metric display element which represents a tolerance band of the movement of the grading element. The scale of the display information is greater at a first position of the grading element relative to the target zone that at a second position of the grading element relative to the target zone.

The display information decreases in scale as the grading element moves away from the target zone.

The display information may comprise of a third metric display element representing at least a partial scope of movement of the grading element relative to a target vertical plane. The third metric display element changes as the grading element moves when the cab rotates in a yaw direction relative to a ground-engaging element coupled to the frame.

The display information may change color as the grading element passes from above the target zone to below the target zone.

The display information may further adapt in scope as the grading element passes a predefined threshold from the target zone.

This predefined threshold may change based on one of a surface grading operational input, work machine type input, a grading element type input, a user input, and a program file input.

Similarly, the method of controlling a display on a work machine having grade control includes receiving detection signal from a sensor, and changing a scale on a display element of the display information related to movement of the grading element relative to the target zone.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 7b is a top view of the work machine in FIG. 1 correlating to FIG. 7a.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, "controller" 235 is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 235 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 235 may be in communication with other components on the work machine 100, such as hydraulic components, electrical components, and operator inputs within an operator station of an associated work machine. The controller 235 may be electrically connected to these other components by a wiring harness such that messages, commands, and electrical power may be transmitted between the controller 235 and the other components. Although the controller 235 is referenced in the singular, in alternative embodiments the configuration and functionality described herein can be split across multiple devices using techniques known to a person of ordinary skill in the art. The controller 235 includes the tangible, non-transitory memory on which are recorded computer-executable instructions, including a control algorithm. The processor 245 of the controller 235 is configured for executing the control program instructions 240.

The controller 235 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

As such, a method 300 may be embodied as a program instruction 240 operable on the controller 235. It should be appreciated that the controller 235 may include any device capable of analyzing data from various sensors, comparing data, making decisions, and executing the required tasks.

Figure 1:
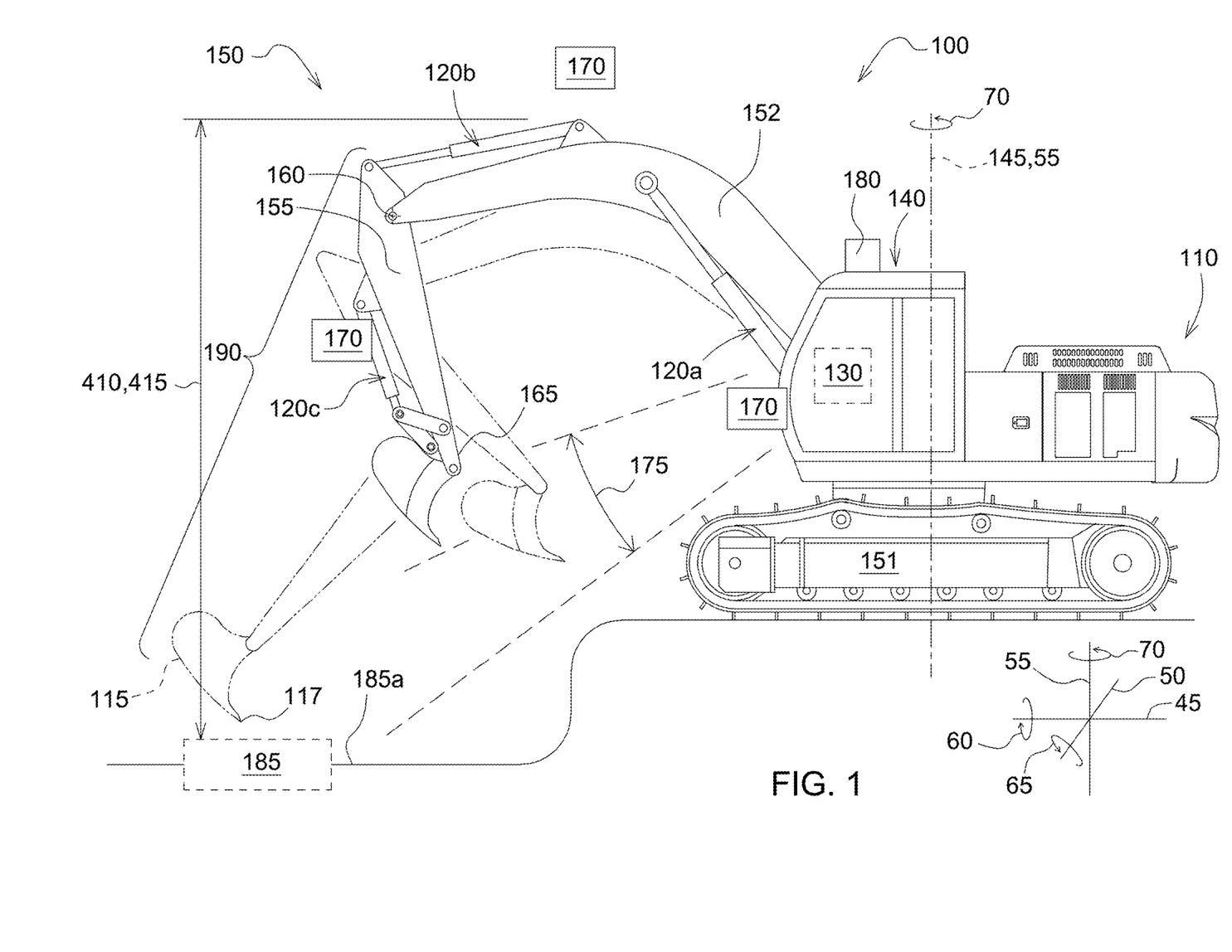
FIG. 1 is a side view of one embodiment of a work machine, shown as an excavator.

FIG. 1 is a side view of one embodiment of a work machine 100, shown as an excavator, with a boom assembly 150 in varying positions. It should be understood, however, that the work machine 100 could be one of many types of work machines, including, and without limitation, a skid steer, a backhoe loader, a front loader, a bulldozer, and other construction or agricultural vehicles with a grading capacity. Direction for the work machine may also be referred to with regard to longitude 45 or the longitudinal directions, latitude 50 or the lateral direction, and vertical 55 of the vertical direction. Rotations for the work machine 100 may be referred to roll or the roll direction 60, pitch 65 or the pitch direction, and yaw 70 or the yaw direction or heading. The excavator comprises of a frame 110, a grading element 115 movably coupled to the frame 110, and at least one actuator (120a, 120b, 120c) coupled to the grading element 115 to controllably drive movement of the movable grading element 115. The grading element 115 may be a cutting edge of a blade, a bucket, or another implement form used for shaping a surface. The work machine 100 may be operated to engage the ground and cut and move material to achieve simple or complex ground features on the ground.

A user input interface, located on one or more of the work machine 100 or a remote station, may include control levers, control pedals, buttons, and a display 130 (e.g. a graphical display unit). The display 130 (detailed in FIG. 4) may display information 205 such as various work machine function icons 135, operator inputs, and positioning of the grading element 115. For excavators, the upper portion (or cab 140) of the frame may be pivotally mounted on the undercarriage portion of the frame, allowing for the cab 140 to reorient about a yaw axis 145. The operator cab 140 can be optional if the cab is operated remotely and/or autonomously. A boom assembly 150 couples the grading element 115 to the frame 110. In the present embodiment, the boom assembly 150 comprises a boom 152 operable to move relative to the frame 110 by a first actuator 120a, a dipper stick 155 operable to move about a pivot axis 160 by a second actuator 120b, and the grading element 115 operable to move about a second pivot axis 165 relative to the frame 110 by a third actuator 120c. At least one sensor 170 may be operable to sense one or more of a position 171 or a direction of movement 172 of the grading element 115. In one embodiment, the position 171 and the direction of movement 172 may be derived from a composite of positions sensed of each actuator 120 on the boom assembly 150 to calculate the relative angular positioning of each boom assembly (152, 155, 115) component relative to the frame 110. In another embodiment, a position of the cutting edge 117 of the grading element 115 can be measured through a sensor 170 coupled to the front of the frame 110, with the cutting edge 117 in a line of sight 175 from the sensor 170.

Alternatively, the position of the grading element 115 can be derived from a location determining receiver 180 (or some other local reference) combined with a sensing of the positioning of the boom assembly 150 (or its components) relative to the frame 110. The exemplary means of determining a position 171 or direction of movement (derived from tracking the position) of the grading element 115 listed here should not be deemed limiting.

Although the present embodiment is an excavator, the disclosed system 200 and method 300 are particularly advantageous for work machines with a relatively large range of movement for the boom as compared to the grading element 115 (e.g. loaders, crawlers, etc.). The excavator, for example, may have target zones 185 for grading with a ±0.03 meters range, whereas the range of movement 190 of a grading element may be greater than ±3.0 meters. This can be attributed to the degree of movement required from each boom assembly component (152, 155, 115), a variable that differs from one work machine type to another work machine type. Fine movement of the grading element 115 in or near the target zone 185 require more finely attuned adjustments to achieve the target grade. Large movements of the grading element 115 are required when moving payloads from one location to another (to another work machine for example).

Figure 2:
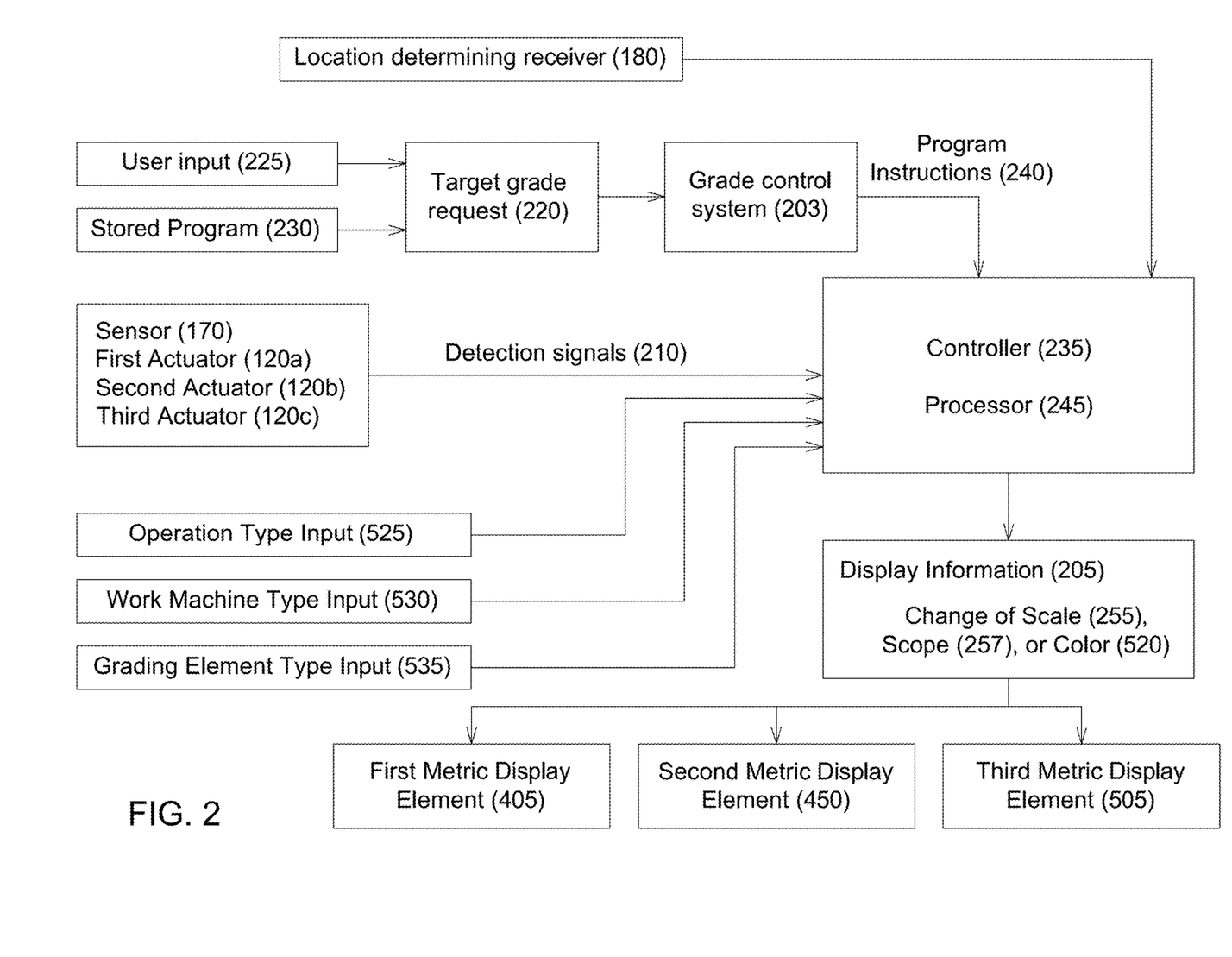
FIG. 2 is a block diagram of the system architecture of a display system for a work machine having grade control.

Now turning to FIG. 2 with continued reference to FIG. 1, the display system 200 for a work machine with grade control further comprises a display 130 configured to display information 205 related to movement of the grading element 115 relative to a target zone 185. One or more sensors 170 provide detection signals 210 from which the distance between a position of the grading element 115 and the target zone 185 can be determined. A target zone 185 can be based on a target grade request 220 from either a user input 225 or a stored program 230 in accordance with a predetermined sequence of target grades from a storage medium. The controller 235 has a non-transitory computer readable medium with program instructions 240 to grade the surface. The program instructions 240 when executed causes a processor 245 of the controller 235 to receive the detection signals 210 and change one of a scale 255 or a tolerance band of the metric 455 and color of the display information 205 based on the detection signals 210.

Figure 4:
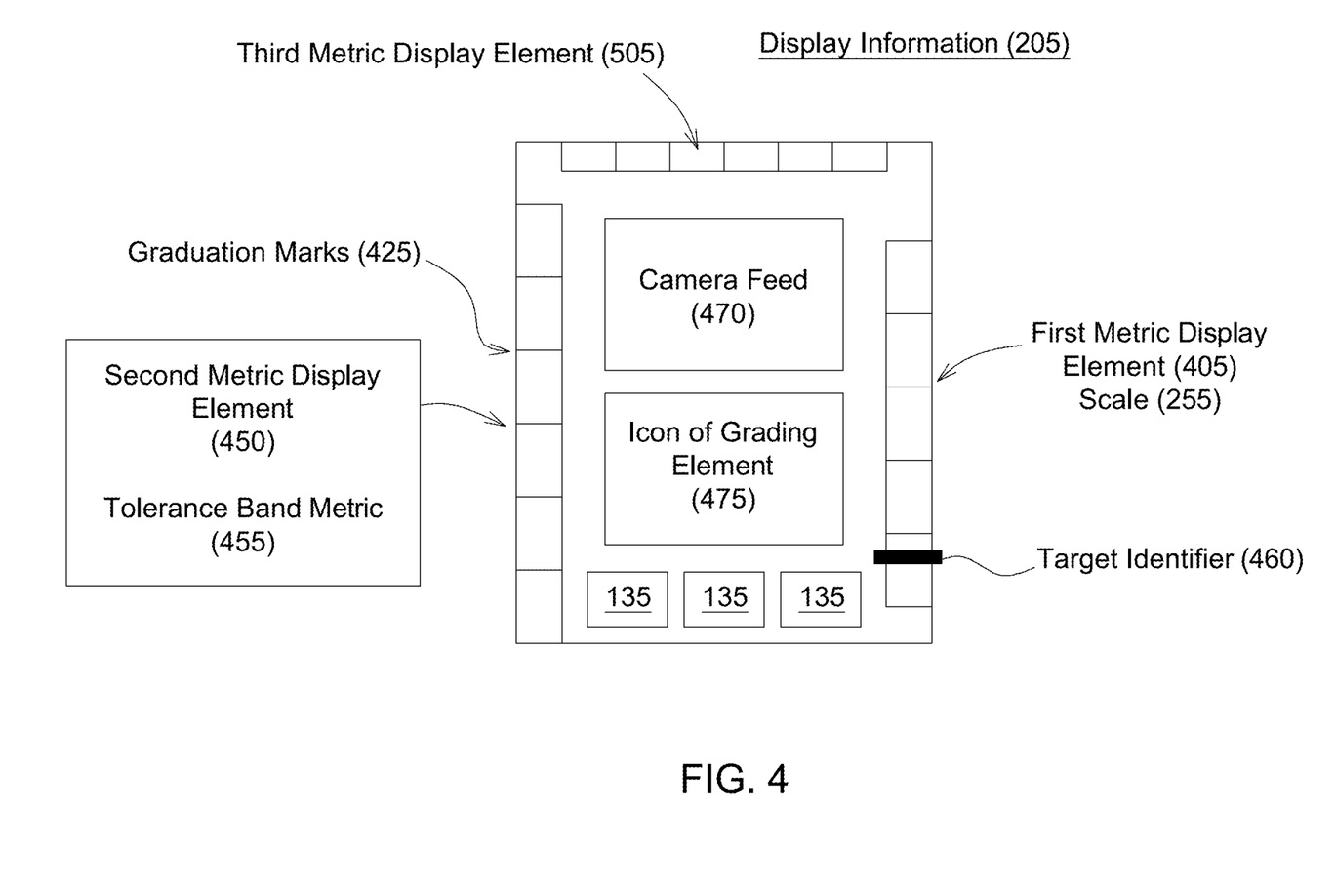
FIG. 4 is an exemplary embodiment of the display information on a display.
Figure 5A:
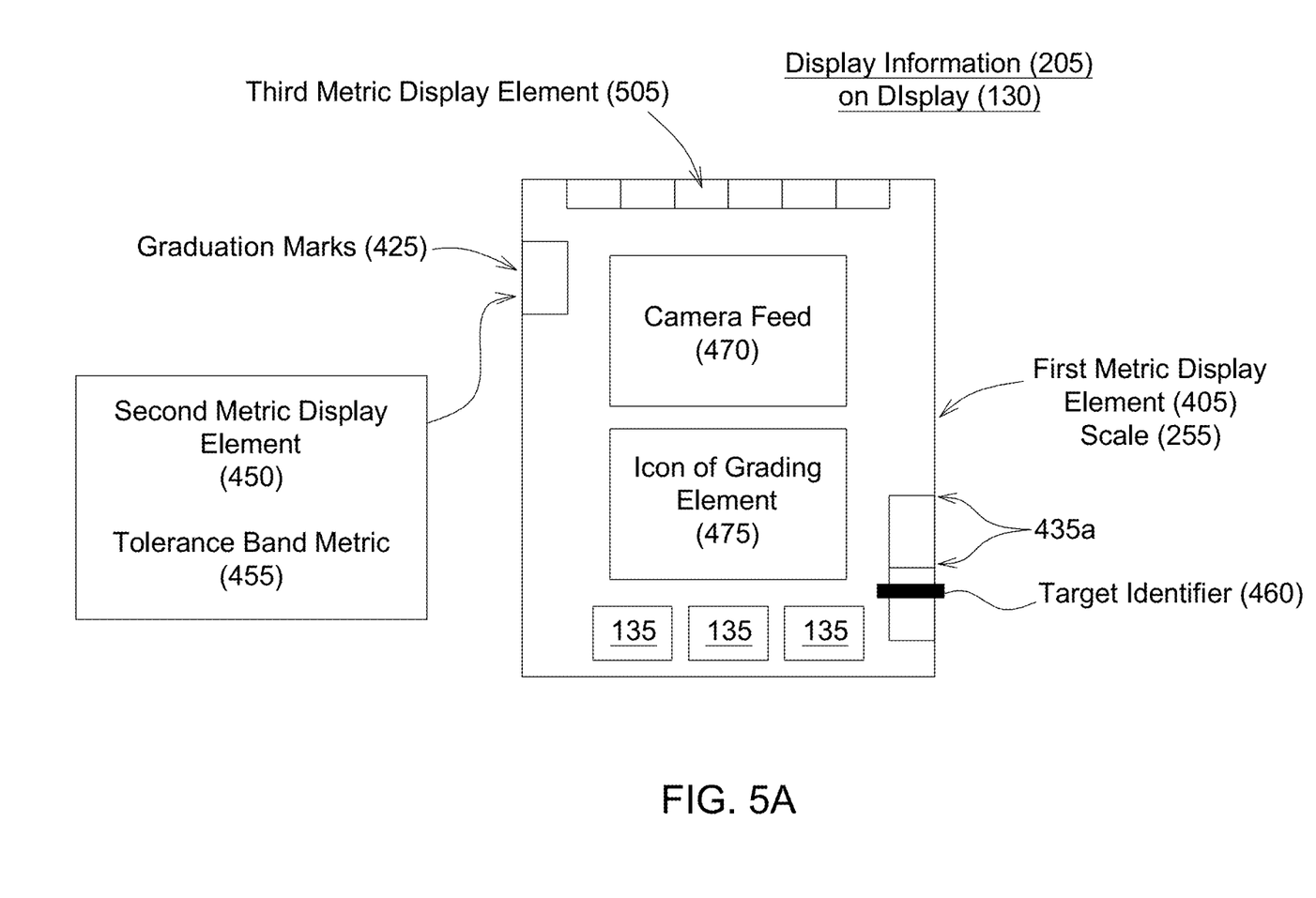
FIG. 5a is a detailed view of the display information on a display according to a first position of the grading element relative to a target surface.
Figure 5B:
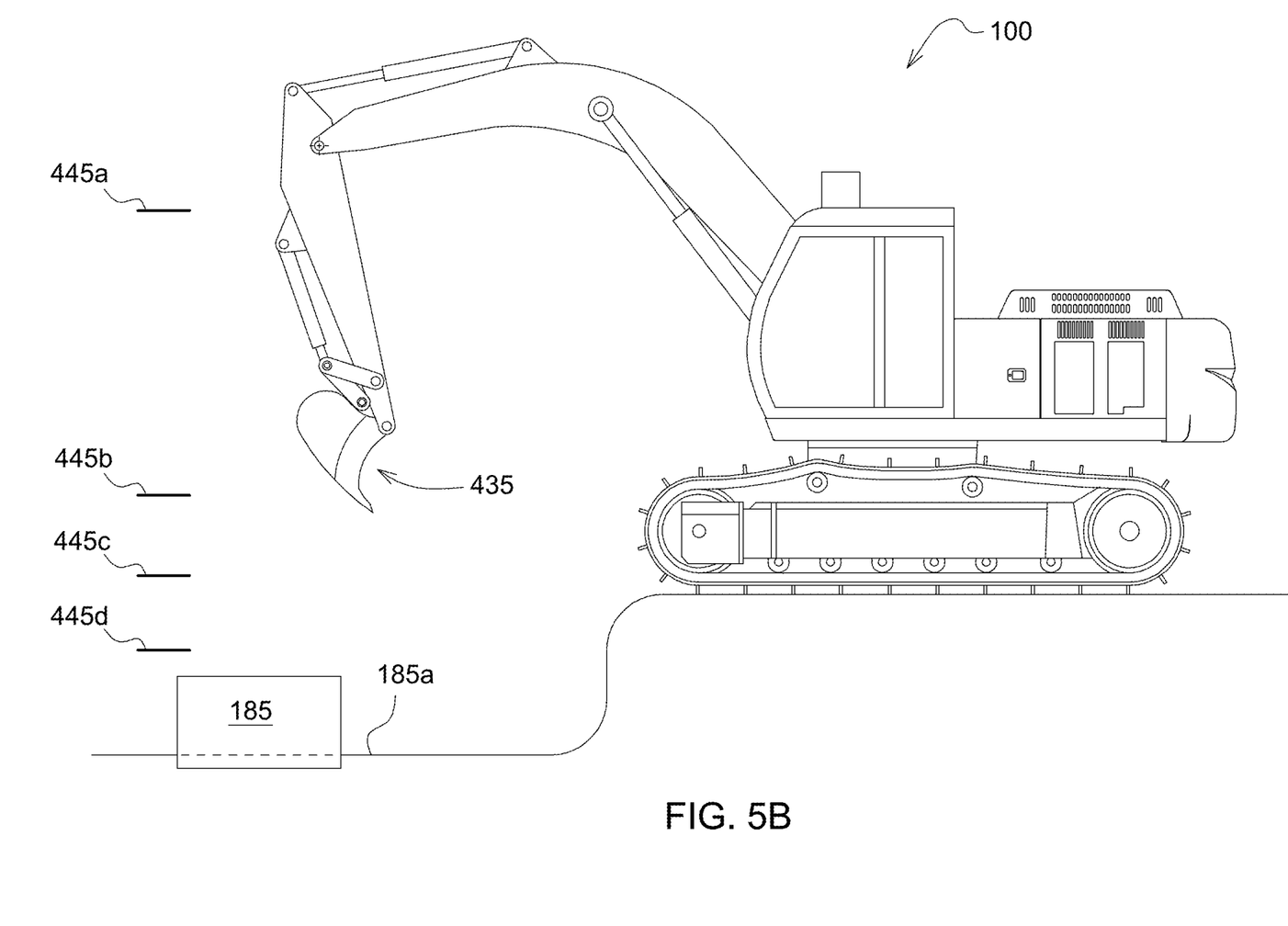
FIG. 5b is a side view of the work machine in FIG. 1 in the first position.
Figure 6A:
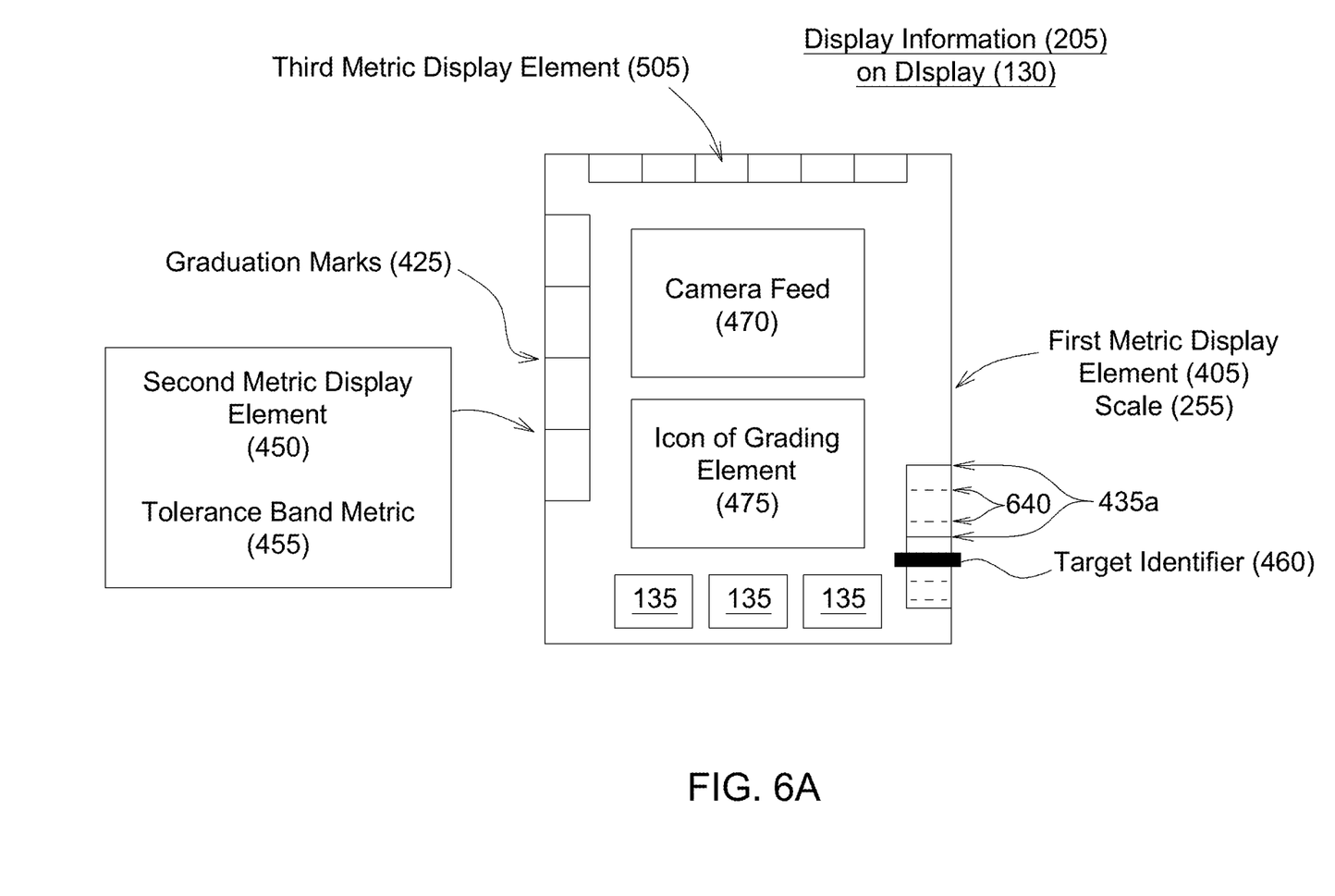
FIG. 6a is a detailed view of the display information on the display according to a second position of the grading element relative to a target surface.
Figure 6B:
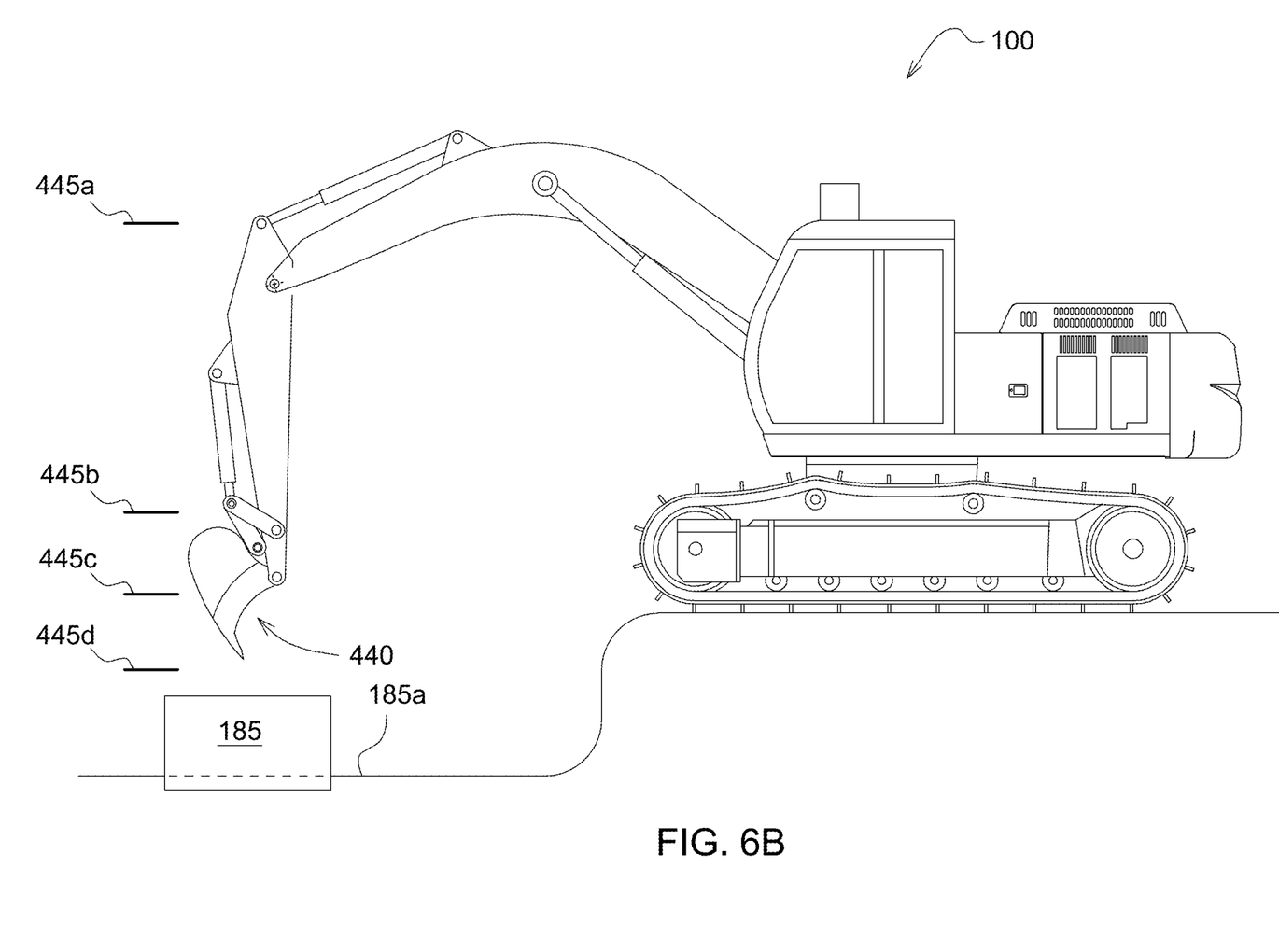
FIG. 6b is a side view of the work machine in FIG. 1 in the second position.

As shown in FIG. 4, the display information 205 comprises of a first metric display element 405 wherein the first metric display element 405 represents at least a partial scope of movement 410 of the grading element 115 in a vertical direction 415. The first metric display element 405 correlates to the scope of movement 410 depicted in FIG. 1 and highlights the position of the grading element 115 with a marker positioned along the first metric display element 405. The markers in this embodiment are a graduated range of values at regular intervals forming a standard at which the positioning of the grading element relative to one of the target zone 185, target surface 185a, and a frame 110 can be conveyed. Current industrial means communicate a position of the grading element 115 include lit LEDs on a lightbar representing the position of the grading element 115 as the grading element 115 approaches the target zone 185. The display information 205 may further include a camera feed (470) and an icon of a grading element (475). Now turning to FIGS. 5A and 5B, the first metric display element 405 may further adapt the scale 255 of its graduation marks 425 as the grading element 115 approaches the target zone 185, or a target surface 185a within a target zone 185. In this particular embodiment, the scale 255 (exemplified by the solid lines 435a spaced equally apart in the first metric display element) of the display information 205 is greater at a first position 435 of the grading element 115 relative to the target zone 185 than at a second position 440 of the grading element 115 relative to the target zone 185. That is, a zooming in on the scale 255 (exemplified by the dotted lines 640 in FIG. 6a spaced equally apart in the first metric display element 405) occurs as the grading element 115 approaches the target zone 185. The adaptation of the scale 255 may occur in real-time (i.e., dynamically) or as the grading element 115 passes one or more threshold positions 445 in its scope of movement 410. Exemplary threshold positions (445a-445d) are shown to need not be equally spaced apart because a zooming in on the scale may occur at a more finely tuned display of the position of the grading element 115 and control of the grading element becomes beneficial as the grading element 115 nears the target zone 185. As the grading element 115 descends towards the target zone 185 a zooming in occurs. A zooming outwards occurs as the grading element 115 continues descending past and away from the target zone. An industrial application would be to gauge how much fill material is placed into a recessed area.

The display information 205 may further comprise a second metric display element 450 wherein the second metric display element 450 displays a tolerance band metric 455 of the grading element 115 based on its position relative to the target zone 185. As previously discussed, the tolerance band metric 455 for movement of the dipper stick 155 at pivot axis 160 may be +/−3m whereas the tolerance band metric 455 for movement of the grading element 115 at pivot at a second pivot axis 165 may be +/−0.03 m. The combined display of the tolerance band metric 455 on the second metric display element 450, and the position of the grading element 115 relative to the target zone 185 on the first metric display element 405 advantageously allows for the operator to maintain a sense of proximity, at a glance, between the current position of the grading element 115 and the target zone 185 because smaller tolerance bands are expected as the grading element 115 nears the target zone 185. Similar to the first metric display element 405, the second metric display element 450 representing the tolerance band metric 455 may also adjust its scale 255 as the grading element 115 approaches the target zone 185. Although the present image shown is a vertical bar, other alternatives can include any shape or form displaying a magnitude of tolerance or precision of the grading element relative to the target zone. This can include line graphs, gauges, bar graphs, a progress graphs, bubble graphs and color-coded alerts, to name a few.

The display information 205 may further comprise of a target identifier 460 overlapping a portion of the first metric display element 405 wherein the target identifier 460 represents one or more of a target surface 185a and a target zone 185.

Figure 7A:
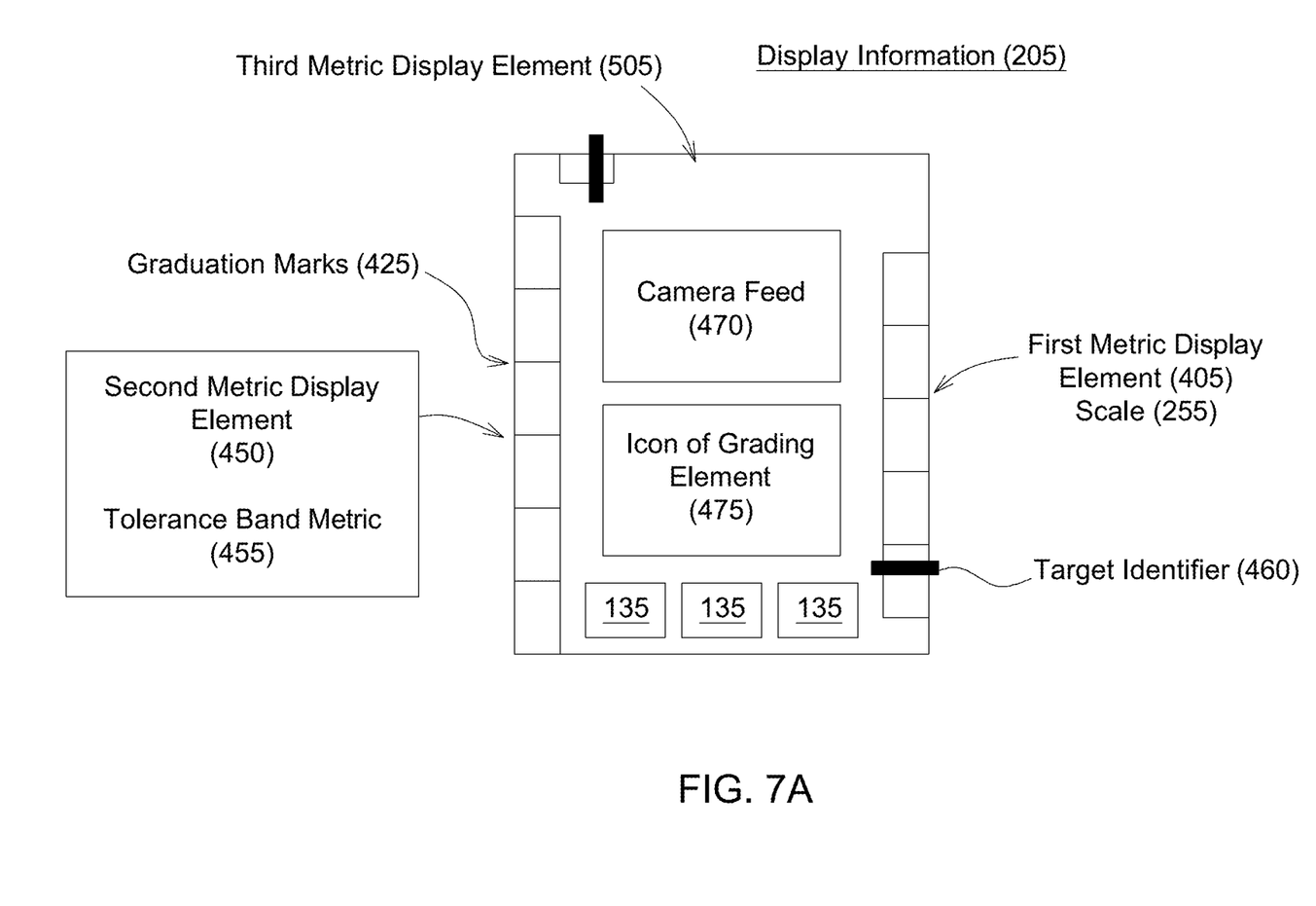
FIG. 7a is a detailed view of the display information on the display of the grading element of the cab relative to an imaginary vertical surface.
Figure 7B:
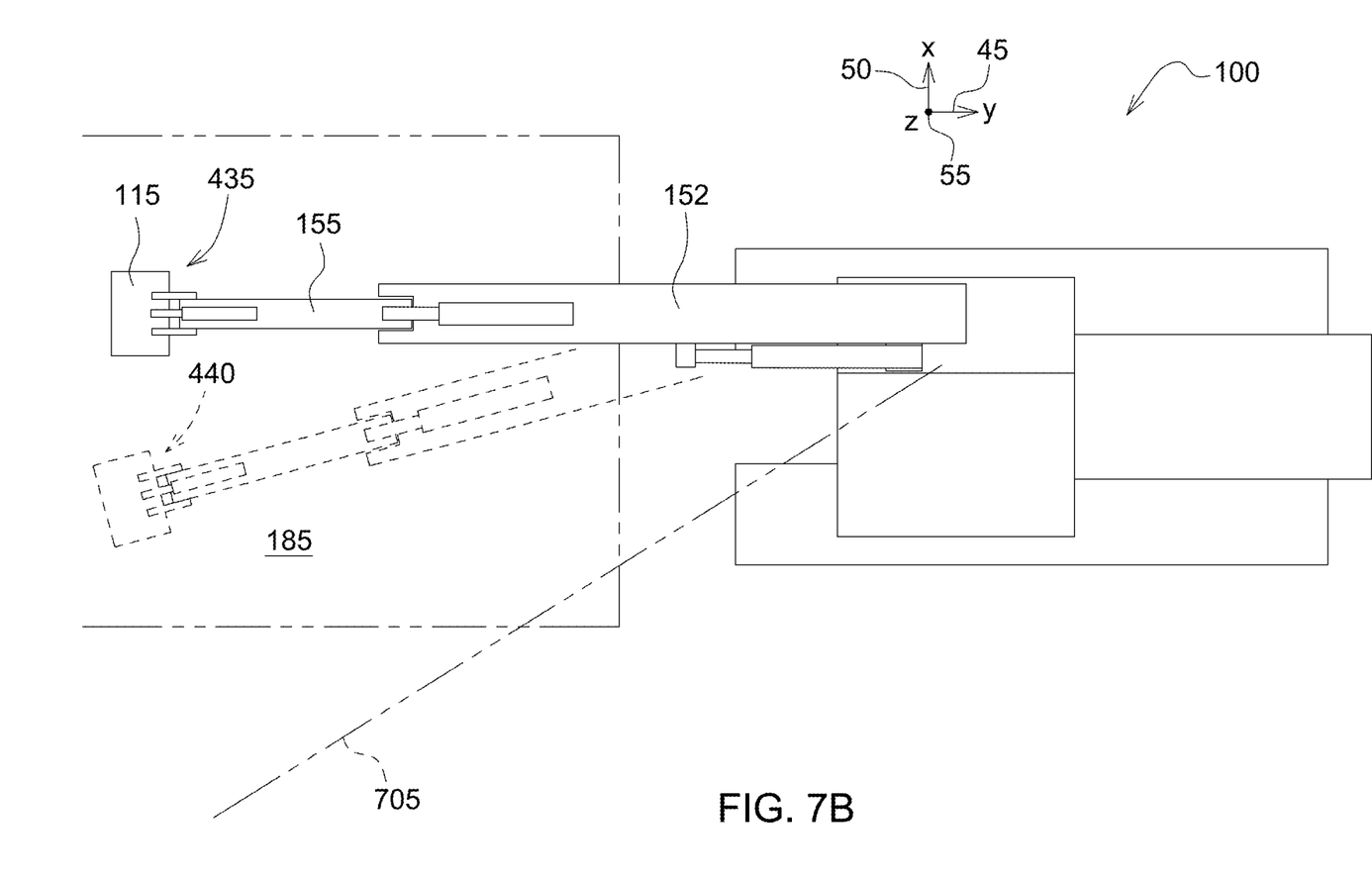

Similar to the first metric display element 405, the display information 205 may further comprise of a third metric display element 505 representing at least a partial scope of movement 510 of the grading element 115 relative to a target zone 185 comprising of a target vertical plane 705 and the third metric display element 505 changing as the grading element moves when the cab rotates in a yaw direction relative to a ground-engaging element coupled to the frame.

The display information 205 may change color 520 when the display information changes scale 255. Alternatively, the display information may change color 520 as the grading element passes from above the target zone 185 to below the target zone 185. Alternatively, the display information may change color 520 as the grading element passes from above the target surface to below the target surface.

The display information 205 may adapt in scope 257 as the grading element passes a predefined threshold from the target zone wherein the predefined threshold is one or more predefined threshold distances of the cutting edge from the target zone or target surface. The range of movement displayed will either increase or decrease upon passing the predefined thresholds.

This predefined threshold position 445 may change based on one of a surface grading operation input 525, a work machine type input 530, a grading element type input 535, a user input 225, and a program file input 230. For example, some grading operations require moving large quantities of surface material from one location to another such as an excavator wherein the grading element is a bucket. In these applications, the predefined thresholds are wider in range because of the wide range of movement of the grading element relative to the surface and that frame. In instances where the ground is contoured for adding a gradual slope (e.g., directing water runoff), the predefined threshold are more narrow in range because of the increased precision required.

Additionally, the display system 200 advantageously enables the operator to further gauge performance at a glance when the work machine is run semi-autonomously or autonomously (e.g., grade control only is automated), and thereby allows for the operator to decide whether or not to interrupt grade control. As shown in FIG. 7a, the display information may comprise of a third metric display element representing at least a partial scope of movement of the grading element relative to a target vertical plane. The third metric display element changes as the grading element moves when the cab rotates in a yaw direction relative a ground-engaging element relative to the frame. The target vertical plane is similar to the target zone. However, the target vertical plane can be seen as a boundary plane with which the grading element is required to stop.

Figure 8:
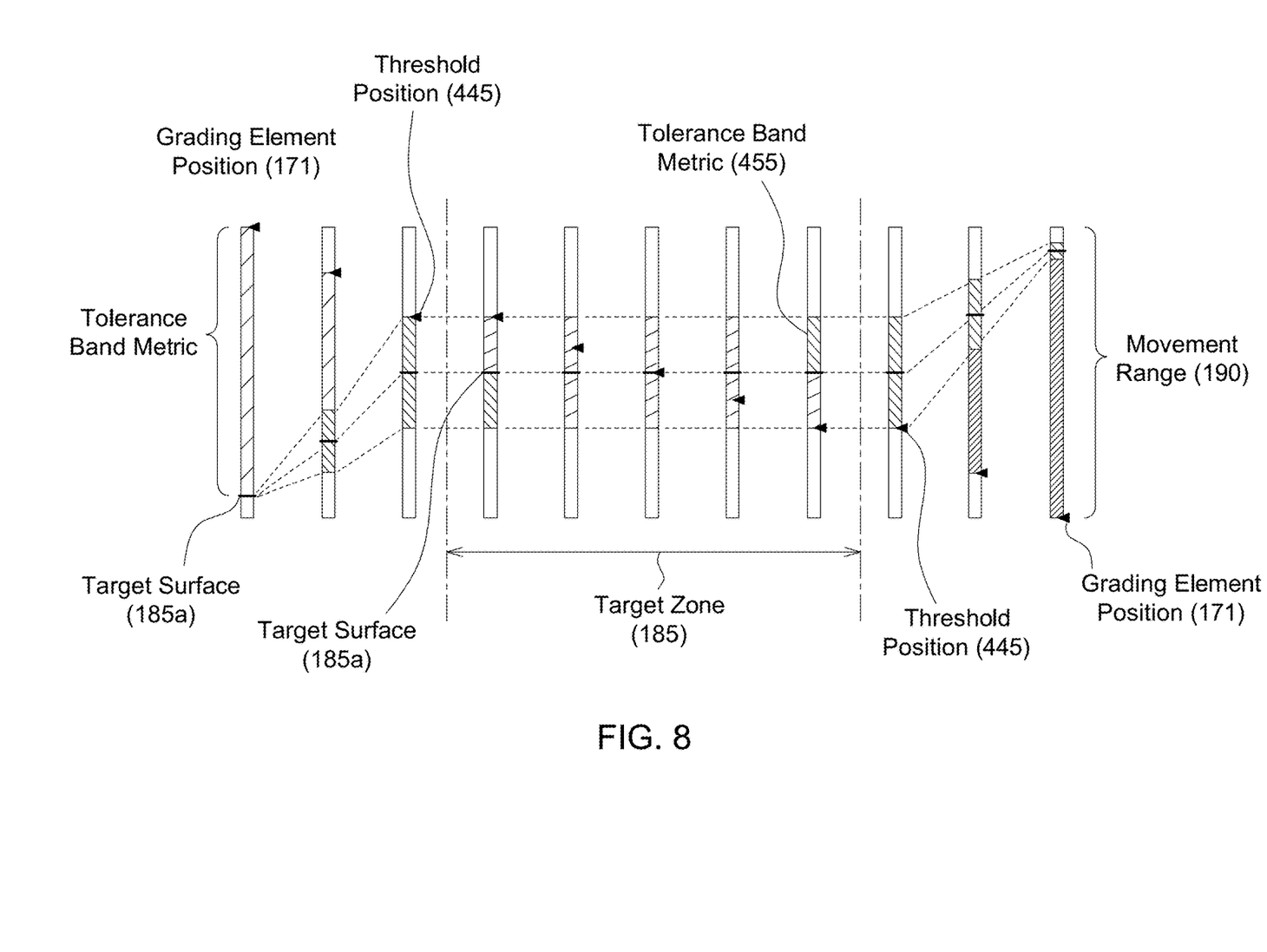
FIG. 8 is a schematic displaying one embodiment of the zoom behavior of the display information over a range of motion of the grading element.

FIG. 8 is a schematic displaying one embodiment of the zoom behavior of the display information over a range of motion along with the associated tolerance band of the grading element. Each vertical bar along the x-axis represents the scaling of the display information upwards or downwards (or zoom) as the grading element is positioned throughout the range of movement. The full range of movement 190 is represented by the full length of the vertical bar and the arrows represent positioning 171 of the grading element 115 from one end of the of the movement range 190 to the other end. Positions 171 (as indicated by the arrows) of the grading element 115 within the target zone 185 are represented by the two vertical dotted lines. The three horizontal dotted lines represent the zooming in (or scaling of) the area about and including the target surface 185. The middle dotted horizontal line is the target surface 185a (also indicated by the bold horizontal line on each vertical bar). The top dotted line represents a zoomed area above the target surface 185a when the target zone 185 is entered. The bottom dotted line represents a zoomed area below the target surface 185a when the target zone 185 is entered. The hash-lined regions are indicators of the tolerance band metric 455 (or error of magnitude) for the grading element 115 shown throughout the movement range 190. As shown, the further away a grading element is from a target surface, the tolerance band metric 455 increases. In one embodiment the correlation can be linear. In another embodiment (as shown), the tolerance band metric 455 will shift stepwise as the grading element passes threshold positions 445.

Figure 9:
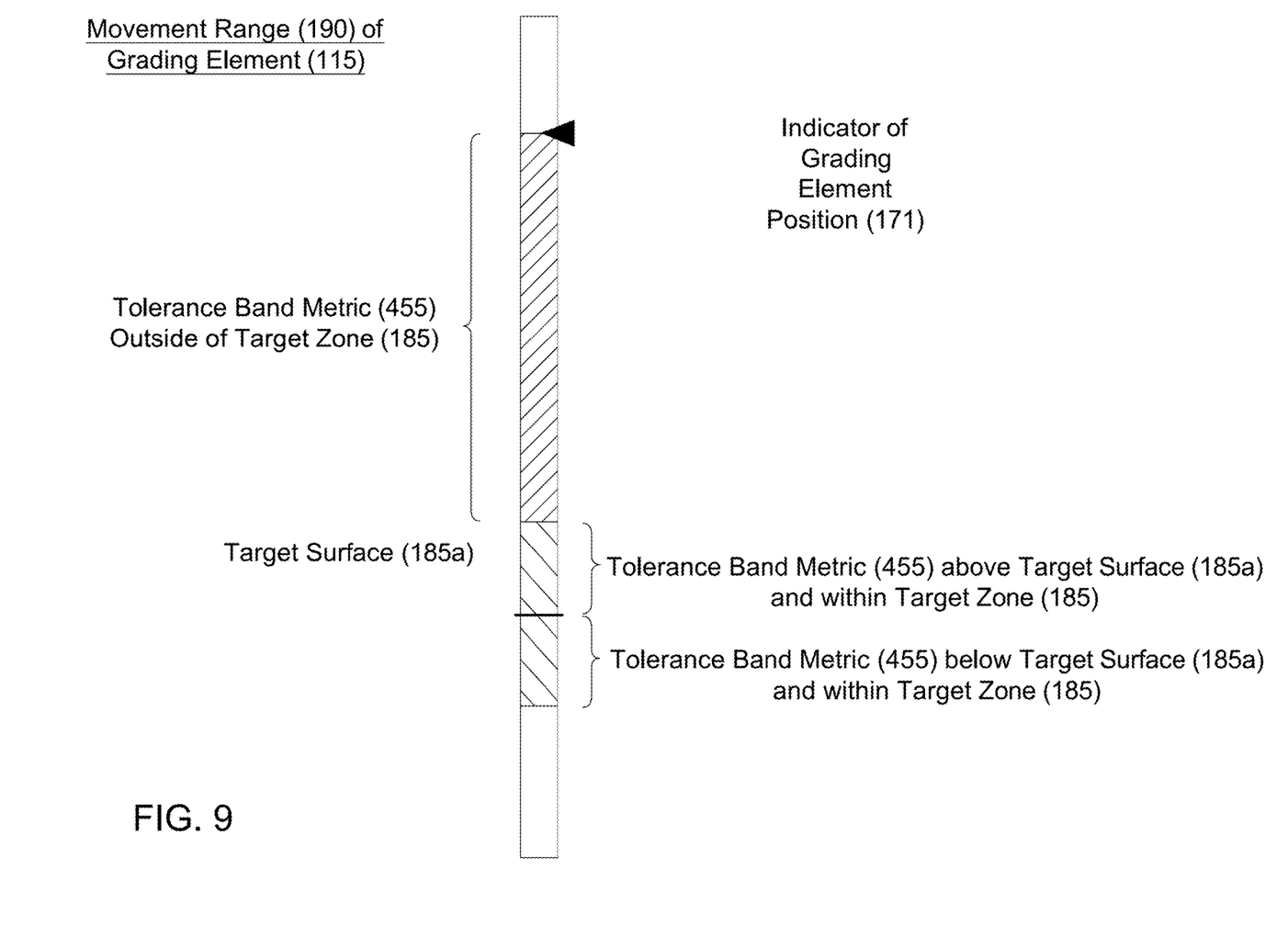
FIG. 9 is a simplified schematic of the second metric display element showing the tolerance band metric of the grading element over a range of motion.

FIG. 9 disclose a simplified schematic of the second metric display element showing the tolerance band metric of the grading element over the grading element's range of movement. Depending on the application (e.g., excavating, surface contouring, etc.).

Figure 3:
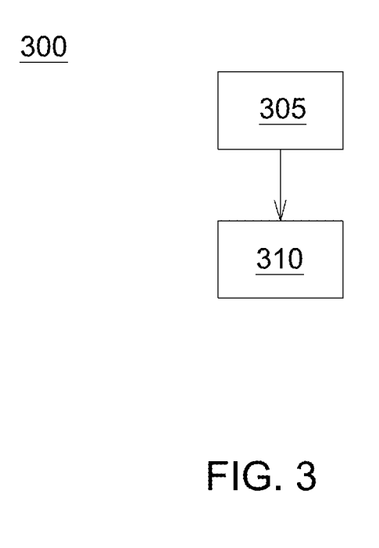
FIG. 3 is a flowchart of a method of controlling a display for a work machine having a grade control.

Now turning to FIG. 3, a method for controlling a display on a work machine having a grade control system 203 is shown. In a first step 305, the controller receives detection signals from a sensor wherein the detection signals indicative of a distance between a position of a grading element of a work machine and a target zone. In step 310, the display information changes scale wherein the display information is related to movement of the grading element relative to the target zone.

As used herein, "e.g." is utilized to non-exhaustively list examples, and carries the same meaning as alternative illustrative phrases such as "including," "including, but not limited to," and "including without limitation."

As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C).

As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The invention claimed is:

1. A display system for a work machine having grading element control, the display system comprising:
    a frame of the work machine;
    a grading element movably coupled to the frame;
    an actuator coupled to the grading element to controllably drive movement of the grading element;
    a grade control system operably coupled to the grading element to control the actuator to move the grading element;
    a display configured to display a display information related to a movement of the grading element relative to a target zone;
    a sensor providing detection signals from which a distance between a position of the grading element and the target zone can be determined; and
    a controller having a non-transitory computer readable medium with a program instruction to grade a surface, wherein the program instructions when executed causes a processor of the controller to:
    receive the detection signals, and
    change a scale of the display information based on the detection signals.

2. The display system of claim 1 wherein the display information comprises of a first metric display element, the first metric display element representing at least a partial scope of a movement of the grading element in a vertical direction.

3. The display system of claim 2 wherein the display information further comprises of a target identifier overlapping a portion of the first metric display element, the target identifier representing one or more of a target surface, and a target zone.

4. The display system of claim 2 wherein the display information further comprises of a second metric display element, the second metric display element representing a tolerance band of the movement of the grading element.

5. The display system of claim 1 wherein the scale of the display information is greater at a first position of the grading element relative to the target zone than at a second position of the grading element relative to the target zone.

6. The display system of claim 1 wherein the display information decreases in scale as the grading element moves away from the target zone.

7. The display system of claim 1, wherein the display information comprises of a third metric display element representing at least a partial scope of movement of the grading element relative to a target vertical plane, the third metric display element changing as the grading element moves when the cab rotates in a yaw direction relative to a ground-engaging element coupled to the frame.

8. The display system of claim 1, wherein the display information changes color from the grading element passing from above the target zone to below the target zone.

9. The display system of claim 1, wherein the display information further adapts in scope as the grading element passes a predefined threshold from the target zone.

10. The display system of claim 9, wherein the predefined threshold changes based on one of a surface grading operational input, a work machine type input, a grading element type input, a user input, and a program file input.

11. A method of controlling a display on a work machine having a grade control system with a controller having a non-transitory computer readable medium with a program instruction when executed causes the work machine having the grade control system to grade a surface, the method comprising:

receiving detection signals by a processor from a sensor, the sensor configured to receive the detection signals indicative of a distance between a position of a grading element of the work machine and a target zone; and changing a scale on a display element of a display information by the processor wherein the display information is changing scale based on determined movements of the grading element relative to the target zone, wherein movements are determined at least in part via the detection signals and predefined threshold distances from the target zone of the grading element.

12. The method according to claim 11, wherein the display information comprises of a first metric display element, the first metric display element representing at least a partial scope of movement of the grading element in a vertical direction.

13. The method according to claim 12, wherein the display information further comprises of a target identifier overlapping a portion of the first metric display element, the target identifier representing one of a target surface, and a target zone.

14. The method according to claim 11, wherein the display information further comprises of a second metric display element, the second metric display element representing a tolerance band of the movement of the grading element.

15. The method according to claim 11, wherein the scale of the display information is greater at a first position of the grading element relative to the target zone than at a second position of the grading element relative to the target zone.

16. The method according to claim 11, wherein the display information decreases in scale as the grading element moves away from the target zone.

17. The method according to claim 11, wherein the display information comprises of a third metric display element representing at least a partial scope of movement of the grading element relative to a target vertical plane and the third metric display element changing as the grading element moves when the cab rotates in a yaw direction relative to a ground-engaging element relative to the frame.

18. The method according to claim 11, wherein the display information changes color from the grading element passing from above the target zone to below the target zone.

19. The method according to claim 12, wherein the display information further adapts in scope as the grading element passes a predefined threshold from the target zone.

20. The method according to claim 19, wherein the predefined threshold changes based on one of surface grading operational input, a work machine type input, a grading element type input, a user input, and a program file input.

* * * * *